United States Patent
Singhai et al.

(10) Patent No.: US 11,144,907 B2
(45) Date of Patent: Oct. 12, 2021

(54) RESOURCE PROVIDER AGGREGATION AND CONTEXT-BASED CONTENT NOTIFICATION SYSTEM

(71) Applicant: Visa International Service Association, San Francisco, CA (US)

(72) Inventors: Pranjul Singhai, Braddell View (SG); Ashok Babu Mundru, Simei (SG); Luong Hoa Ton, Singapore (SG); Satrajit Ray, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 770 days.

(21) Appl. No.: 15/486,019

(22) Filed: Apr. 12, 2017

(65) Prior Publication Data

US 2018/0300709 A1    Oct. 18, 2018

(51) Int. Cl.
*G06Q 20/32* (2012.01)
*H04W 4/02* (2018.01)
(Continued)

(52) U.S. Cl.
CPC ....... *G06Q 20/3224* (2013.01); *G06Q 20/123* (2013.01); *G06Q 50/30* (2013.01);
(Continued)

(58) Field of Classification Search
CPC .. G06Q 20/3224; G06Q 20/123; G06Q 50/30; H04L 67/2833; H04L 67/20;
(Continued)

(56) References Cited

U.S. PATENT DOCUMENTS

| 8,630,897 B1 | 1/2014 | Prada Gomez |
| 2008/0189148 A1 | 8/2008 | Diaz et al. |

(Continued)

FOREIGN PATENT DOCUMENTS

| WO | 2016113602 | 7/2016 | |
| WO | WO-2016113602 A1 * | 7/2016 | ......... G06Q 30/0639 |

OTHER PUBLICATIONS

Andrew J. Hawkins. The Verge. Dec. 2, 2015. (Uber wants to integrate with all your apps) <https://www.theverge.com/transportation/2015/12/2/9835604/uber-button-app-developer-API-rideshare> [Accessed Aug. 5, 2021]. (Year: 2015).*

(Continued)

*Primary Examiner* — Daniel Vetter
*Assistant Examiner* — Manal A. Alsamiri
(74) *Attorney, Agent, or Firm* — Kilpatrick Townsend & Stockton LLP

(57) ABSTRACT

Described herein is a service provider computer and corresponding techniques for, in response to receiving a request for a resource from a client device, aggregating resource provider content and presenting that content via a client device. The service provider computer may identify a number of resource provider computers capable of providing the requested resource. In some embodiments, this may involve communicating with a transaction processing network to identify resource provider computers with which the user has previously transacted. The service provider computer may transmit details of the received request to each of the resource provider computers in the identified number of resource provider computers. The service provider computer may then relay a number of received responses to the client device. In some embodiments, the service provider computer may also identify additional context-based content (Continued)

related to the request and provide that context-based content to the client device.

13 Claims, 6 Drawing Sheets

(51) Int. Cl.
 H04L 29/08 (2006.01)
 G06Q 50/30 (2012.01)
 H04W 4/60 (2018.01)
 G06Q 20/12 (2012.01)
(52) U.S. Cl.
 CPC .............. *H04L 67/20* (2013.01); *H04L 67/22* (2013.01); *H04L 67/26* (2013.01); *H04L 67/2833* (2013.01); *H04W 4/02* (2013.01); *H04W 4/60* (2018.02)
(58) Field of Classification Search
 CPC .......... H04L 67/22; H04L 67/26; H04W 4/02; H04W 4/60
 See application file for complete search history.

(56) References Cited

U.S. PATENT DOCUMENTS

| 2009/0192851 | A1 | 7/2009 | Bishop |
| 2011/0320302 | A1 | 12/2011 | Seriani |
| 2014/0164368 | A1 | 6/2014 | Mitchell et al. |
| 2015/0206267 | A1 | 7/2015 | Khanna et al. |
| 2016/0140789 | A1* | 5/2016 | Wickersham, III ......................... H04L 12/1827 705/12 |
| 2016/0298977 | A1* | 10/2016 | Newlin ................... G01C 21/20 |
| 2017/0228804 | A1* | 8/2017 | Soni ....................... H04L 67/306 |
| 2017/0249653 | A1* | 8/2017 | Karambatsos ..... G06Q 30/0234 |

OTHER PUBLICATIONS

PCT/US2018/025710, "International Search Report and Written Opinion", dated Oct. 1, 2018, 14 pages.
"Google Maps Now Shows Uber, Ola Cabs Near You!", Visited website on Apr. 12, 2017, http://trak.in/tags/business/2016/03/16/google-maps-uber-ola-cabs/, 4 pages.
"Ixigo Launches Ixigo Cabs App, No Juggling Between Multiple Cab Booking Apps", Visited website Apr. 12, 2017, https://inc42.com/buzz/ixigo-launches-ixigo-cabs-app-no-juggling-between-multiple-cab-booking-apps/, 8 pages.
EP18784085.5, "Extended European Search Report", dated Jan. 10, 2020, 9 pages.
Application No. EP18784085.5, Office Action, dated May 26, 2021, 8 pages.

* cited by examiner

RESOURCE PROVIDER AGGREGATION AND CONTEXT-BASED CONTENT NOTIFICATION SYSTEM

BACKGROUND

The proliferation of mobile devices and mobile applications is radically changing the way resources are provided to users. Resource providers now have greater access to users than ever while having minimal barriers to entry. This has allowed an increasing number of resource providers to flourish in the mobile device economy, which has subsequently resulted in increased competition between resource providers. While this increased competition may have had an overall beneficial impact on users (e.g., by pushing prices down), it has also increased the complexity of mobile device transactions. In many instances, a user must open a number of different mobile applications, each associated with a different resource provider, in order to obtain potential transaction information for each resource provider and to see which resource provider is most appealing. This requires that the user provide the same information repeatedly to a number of mobile applications, which is inefficient.

Embodiments of the invention address these and other problems, individually and collectively.

BRIEF SUMMARY

Embodiments of the invention are directed to aggregating resource provider content for a requested resource and presenting that content, as well as context-based content, to a client device. In some embodiments, a user may provide an indication of a requested resource and a service provider computer may identify a number of resource provider computers capable of providing the requested resource. In some embodiments, this may involve communicating with a transaction processing network to identify resource provider computers with which the user has previously transacted. The service provider computer may transmit details of the received request to each of the resource provider computers in the identified number of resource provider computers. The service provider computer may then relay a number of received responses to the client device. In some embodiments, the service provider computer may also identify additional context-based content related to the request and provide that context-based content to the client device.

One embodiment of the invention is directed to a method of presenting a plurality of content to a client device comprising receiving, from the client device, a request including an indication of a resource, determining, based on historical transaction data associated with a user of the client device, a plurality of resource provider computers capable of providing the resource which are preferred by the user, providing, to each of the resource provider computers in the plurality of resource provider computers, information associated with the resource obtained from the request. The method may further comprise receiving, from each of the resource provider computers in the plurality of resource provider computers, content generated for the resource based on the information associated with the resource, and providing, to the client device, an aggregated list of content associated with the resource received from the plurality of resource provider computers. In some embodiments, the method further comprises determining a number of additional content associated with a location proximate to the destination location, and providing, to the client device, the number of additional content.

Another embodiment of the invention is directed to a service provider computer comprising one or more processors, and a memory including instructions that, when executed by the one or more processors, cause the service provider computer to: receive, from a user, a request that includes an indication of a resource, determine, based on historical transaction data associated with the user, a plurality of resource provider computers capable of providing the resource with which the user has transacted in the past, provide, to each of the resource provider computers in the plurality of resource provider computers, information associated with the resource obtained from the request, receive, from each of the resource provider computers in the plurality of resource provider computers, content generated for the resource based on the information associated with the resource, and provide, to the user, an aggregated list of content associated with the resource received from the plurality of resource provider computers.

Another embodiment is directed to a mobile device comprising one or more processors, and a memory including instructions that, when executed by the one or more processors, cause the mobile device to: receive an indication of a resource requested by a user of the mobile device, provide the indication to a service provider computer, receive, from the service provider computer, a plurality of content related to the requested resource, each of the plurality of content associated with a different resource provider computer, receive, from the user of the mobile device, a selection of a content of the plurality of content, and initiate a mobile application associated with a resource provider computer of the selected content.

These and other embodiments of the invention are described in further detail below.

BRIEF DESCRIPTION OF THE DRAWINGS

Various embodiments in accordance with the present disclosure will be described with reference to the drawings, in which.

DETAILED DESCRIPTION

Figure 1:
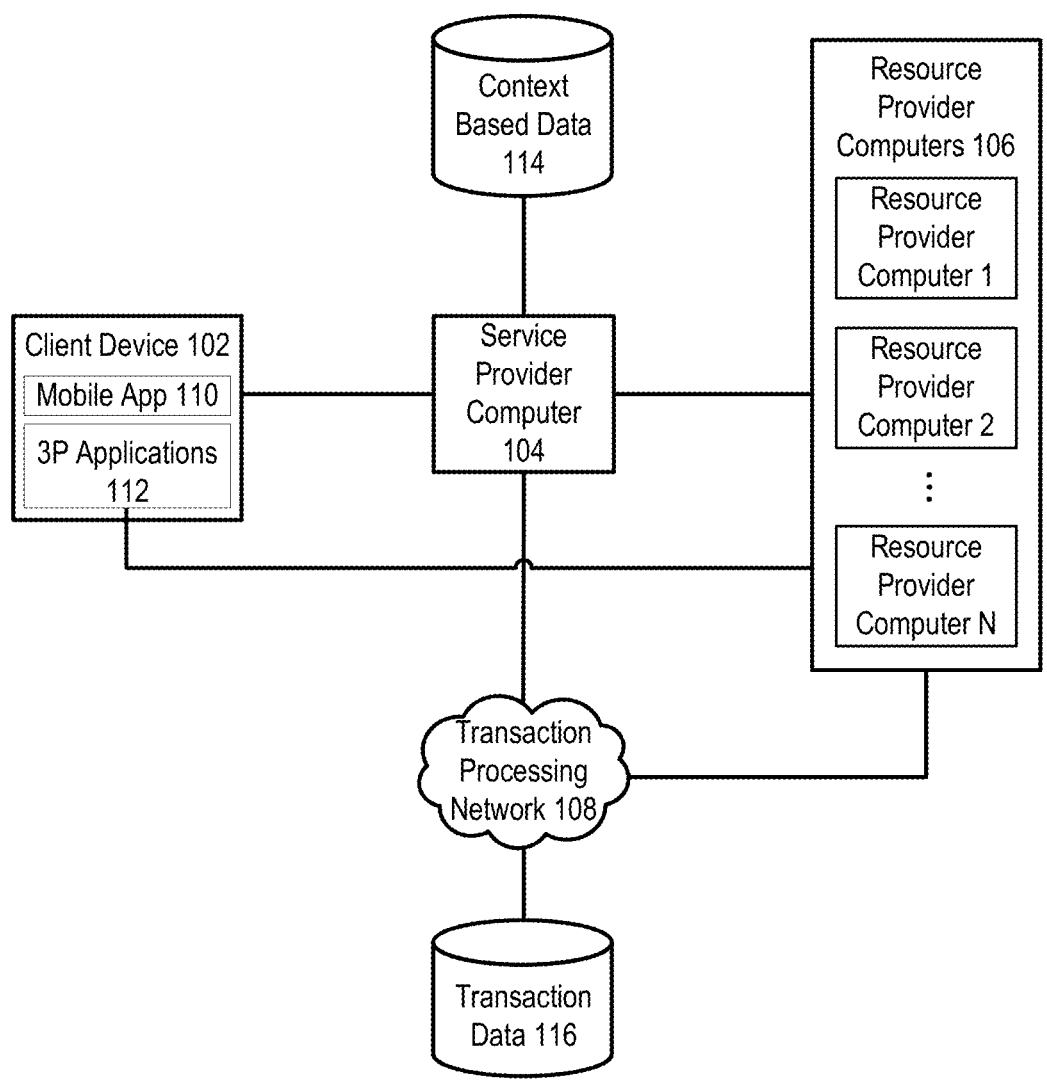
FIG. 1 depicts an illustrative example of a system in which an aggregated set of responses received from various resource provider computers may be provided to a client device in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems, methods, apparatuses, and computer readable media for generating an aggregated list of content responses in relation to a product desired by a user. In some embodiments, a user may enter an indication of a desired product (e.g., a good or service) into a user interface of his or her mobile device. For example, the user may enter details into a user interface associated with a mobile application which is configured to perform at least some of the functionality described herein. In another example, the user may enter details into a user interface associated with a browser application used to enable communication with a remote server. In either example, the details may be provided to a remote service provider computer.

Once the details are obtained by the service provider computer, the service provider computer may identify a number of resource provider computers capable of providing the desired product. In some embodiments, the resource provider computers may be identified by a transaction processing network in communication with the service provider computer. A request for content is then transmitted by the service provider computer to each of the identified resource provider computers. Responses that include offers related to the desired product which are received from each of the resource provider computers may then be relayed to the client device to be presented to the user. The user is then able to select one of the responses, which may cause a transaction to be initiated for the desired product.

In some embodiments, the service provider computer may also identify context-based content which can be provided to a user via a client device. The context-based content may be identified based on a context associated with the received request and/or the selected response. For example, a context may include a time, location, resource type, resource provider, or any other suitable factor. Once identified, the context-based content may be transmitted to the client device. For example, the context-based content may be transmitted to the client device via a push notification.

By way of illustrative example, consider a scenario in which a user wishes to secure transportation to a particular destination. In this example, the user may open a mobile application installed on his or her mobile device which performs at least some of the functions described herein. The mobile application may be one that is specific to transportation services. Once opened, the user may input details related to the desired transportation (e.g., a destination, a time, a particular route, etc.) and the mobile application may relay those details to a remote server (e.g., a service provider computer). In addition, the mobile application may also relay various other details related to the user (e.g., a current location, a list of transportation applications installed on the mobile device, etc.). The remote server, upon receiving this information, may identify a number of transportation providers capable of providing the requested transportation. In this example, a transportation provider may be any provider of transportation services, including a cab driver/dispatcher, an independent contractor who is a vehicle owner, a car rental service, a bus or metro service, or any other suitable transporter. In some cases, the remote server may determine which transportation services are typically used by the user by interacting with a transaction processing network. Once the remote server has identified transportation providers that the user may be interested in using, the remote server may generate and send requests to each of the identified transportation providers to obtain estimates for the requested transportation service from those transportation providers. In this example, the remote server may use application programming interfaces (APIs) to communicate with the transportation providers. Upon receiving estimates from each of the transportation providers, the remote server may present those estimates to the user via the mobile device.

In this illustrative scenario, the user may review a number of offers for the requested transportation service to identify a best offer. In this example, the user may notice that Transportation Provider A has provided an estimate for $14 for the transportation service and indicates that a vehicle can pick up the user in as little as 5 minutes. The user may also notice that Transportation Provider B has provided an estimate for $10 for the transportation service, but indicates that a vehicle cannot pick the user up for at least 13 minutes. In this example, the user may determine that Transportation Provider A's estimate for the transportation service includes the best offer because although Transportation Provider B can provide the transportation service for a lower cost, the additional wait time of 8 minutes is inconvenient for the user. The user may then select Transportation Provider A, which may cause an application associated with Transportation Provider A to be executed in order to complete a transaction for the requested transportation service.

Continuing with the above example, the remote server may also identify various contextual content associated with the selected transportation service. For example, when requesting the transportation service in this example, the user has provided a destination to which he or she wished to be transported. The Transportation Provider A may also provide an estimated time at which the user should arrive at his or her location upon completion of the transaction. In this example, the remote server may identify offers from various businesses within the vicinity of the destination location. In addition to location, the offers may also be determined based on time. For example, if the transportation service is requested in the morning, then the remote server may identify offers related to coffee or breakfast. Alternatively, if the transportation service is requested in the evening, then the remote server may identify offers related to dinner or an evening show. In some cases, the offers may be dependent upon user preference data. For example, the remote server may determine (e.g., based on historical transaction data for the user) that the user prefers a cuisine of a certain culture. In this example, the remote server may identify any offers related to that type of cuisine within a predetermined distance from the destination location. The remote server may then provide any identified contextual content to the user's mobile device (e.g., via a push notification).

By way of a second illustrative example, consider a scenario in which a user wishes to purchase a particular item. In this example, the user may open a mobile application installed on his or her mobile device. Once opened, the user may input details related to the desired item via a graphical user interface of the mobile application. The mobile application may then cause the mobile device to transmit the provided details to a remote server that provides backend support for the mobile application. Once these details are received by the remote server, the remote server may identify a number of retailers that offer the desired item and send inquiries to those retailers. The retailers may be generically referred to as Resource Provider A, Resource Provider B, Resource Provider C, etc. The remote server may then receive responses from each of the retailers that include price and availability information for the item. These responses may then be forwarded to the user's mobile device, where they may be displayed within the graphical user interface. The responses may be presented alongside each other so that the user may consider each response in relation to the others. Once the user has decided on a particular response, the user is able to select that response and the mobile application is configured to initiate a transaction for the user.

In this illustrative scenario, the user may determine that Resource Provider A's response includes the best offer. Upon selection of Resource Provider A's response from the list of responses, the mobile application (or the remote server on the mobile application's behalf) may determine that the mobile device also has a Mobile Application A, which is associated with Resource Provider A. The mobile application may then identify routines and/or methods to be used in interacting with Mobile Application A. The mobile application may then use the identified routines and/or methods to initiate Mobile Application A with at least some of the provided details related to the desired item. The user is then able to complete a transaction associated with the selected response using Mobile Application A.

Continuing with the above example, the remote server may also identify various contextual details associated with the selected response/request. The remote server may then determine a number of content (e.g., offers) which are related to the identified context to be provided to the user via the client device. For example, the remote server may determine a physical location (e.g., a location associated with Resource Provider A) from which the user will need to pick up the desired item. In this example, the remote server may identify other offers provided by Resource Provider A which the user may be interested in. In another example, the remote server may identify content related to activities (such as dining) within a proximity of Resource Provider A's physical location to be provided to the user via the client device.

Prior to discussing embodiments of the invention, description of some terms may be helpful in understanding embodiments of the invention.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "application" may refer to any set of computer-executable instructions configured to cause a processor to execute a function or access a resource. An application may be installed on, and executed from, a client device. Applications may be installed on a client device by a manufacturer of the client device or by another entity. An application installed on a mobile client device may be referred to as a mobile application. A third-party (3P) application may refer to an application that is owned/operated by an entity different than the entity that performs the functions described within this disclosure.

An "application server" may be any computing device configured to provide processing support for an application installed on, and executed from, a client device. In some embodiments, an application server may maintain account information associated with a particular client device and/or user. In some embodiments, an account maintained on an application server may be accessed via the application installed on a client device and/or via an internet connection. In some embodiments, a user may be required to log into an account maintained on an application server. In some embodiments, a mobile device identifier may be associated with the account, such that the account is accessed automatically when the application is executed on that mobile device. In some embodiments, the application server may perform processing functions on behalf of a mobile application installed on a mobile device. In some embodiments, an application server may be a resource provider computer.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "client device" may be any electronic device capable of establishing a communication session with another electronic device (e.g., an application server) and transmitting/receiving data from that device. A client device may include the ability to download and/or execute mobile applications. Client devices may include mobile communication devices as well as personal computers and thin-client devices.

A "mobile device" may include any suitable client device that can be easily transported by user. Examples of mobile devices are described in detail below.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction" may be any interaction or exchange between two or more parties. For example, a transaction may include a first network component requesting resources from a second network component. In this example, the transaction is completed when the resources are either provided to the first network component or the transaction is declined.

A "transaction data" may be any information related to a transaction between two entities. Transaction information may include information related to a completed transaction or a transaction that has not yet been completed. In some embodiments, the transaction information may include any suitable information related to a context of the transaction. For example, the transaction information may include a time at which the transaction was conducted, a terminal at which the transaction was conducted, an amount for which the transaction was conducted, an indication of an entity with whom the transaction was conducted, or any other suitable transaction-related information. Transaction data may include data gathered from authorization requests.

FIG. 1 depicts an illustrative example of a system in which an aggregated set of responses received from various resource provider computers may be provided to a client device in accordance with at least some embodiments. In FIG. 1, a client device 102 is depicted as being in communication with a service provider computer 104. The service provider computer 104 is further depicted as being in communication with a number of resource provider computers 106 (1-N). Additionally, the service provider computer 104 and each of the resource provider computers 106 (1-N) may be in communication with a transaction processing network 108.

In some embodiments, client device 102 may be any suitable computing device capable of receiving user input and processing computer-executable instructions. The client device may be configured to enable communication between a user and another electronic device (e.g., a remote server). In some embodiments, the client device 102 may be a mobile communication device such as a smart phone, personal data assistant (PDA), cellular phone, or any other suitable mobile device. The client device 102 may have installed upon it (e.g., stored within its memory) a number of applications or other sets of computer-executable instructions. In particular, the client device 102 may have installed a mobile application 110 that enables communication between the client device 102 and the service provider computer 104. In addition, the client device 102 may have installed a number of third-party (3P) applications 112 configured to enable communication between the client device 102 and the resource provider computers 106. In some embodiments, the 3P applications 112 may each be configured to enable a user of the client device 102 to perform a transaction with a resource provider computer 106.

In some embodiments, a service provider may be any suitable entity capable of providing at least a portion of the functionality described within this disclosure. A service provider may maintain and/or operate a service provider computer 104 which executes the functionality described herein in accordance with instructions provided by the service provider. In some embodiments, the service provider computer 104 may provide processing support for the mobile application 110 installed upon the client device 102. In some embodiments, the service provider computer 104 may receive a request from a client device 102 for a resource. The service provider computer 104 may, upon receiving that request, determine a category or type to be associated with the resource. Once the category has been identified, the service provider computer 104 may identify a number of resource providers capable of providing the requested resource. In some embodiments, this may be done by communicating with a transaction processing network 108 to determine a user's preference of resource providers. The service provider computer 104 may then communicate with each of the resource provider computers 106 to obtain offers (e.g., bids or estimates) for the resource from those resource providers. An aggregated list of offers may then be provided to the client device 102. In some embodiments, the service provider computer 104 may maintain context-based data 114, which may include content to be provided to the client device 102 upon detecting that one or more contextual conditions have been met or are likely to be met based on the resource requested. For example, if the user selects one of the offers from the aggregated list of offers, then the service provider computer 104 may identify a location at which the selected offer is to be redeemed. The service provider computer 104 may then identify content specific to the identified location to be provided to the client device 102.

In some embodiments, the resource provider may be a merchant, such as a retailer or other provider of goods and/or services. A resource provider may maintain and/or operate a resource provider computer 106 (e.g., a merchant computer) which provides access to resources in accordance with instructions provided by the resource provider. For example, the resource provider computer 106 may be a server computing device that is affiliated with an online retail entity which maintains an electronic catalog of available resources. In some embodiments, each of the resource providers may be associated with a 3P application 112 that may be downloaded onto the client device 102 in order to enable communication between the client device 102 and the resource provider computer 106. In some embodiments, the resource provider computers 106 may be accessed via a browser application using an internet connection. In some embodiments, the service provider computer 104 may communicate with the resource provider computer 106 via a network connection either directly or indirectly. A resource provider computer 106 may be configured to receive a request for a particular resource, identify the resource within an electronic catalog, and provide an offer related to the resource.

In some embodiments, transaction processing network 108 may be a network of computing devices configured to receive transaction requests and to route those received transaction requests to appropriate authorization entities. In some embodiments, the transaction processing network 108 may be an electronic payment network (e.g., VisaNet). The transaction processing network 108 may maintain transaction data 116, which includes historical transaction information associated with a plurality of users. The transaction data 116 may be obtained by parsing information from each of the transaction requests provided to the transaction processing network 108.

By way of illustrative example, consider a scenario in which a user submits a request for a particular product that the user would like to obtain. In this example, the request is entered via the mobile application 110 and relayed to the service provider computer 104. In some cases, the mobile application 110 may also be configured to discover a number of third-party applications 112 installed upon the client device 102, and report those third-party applications 112 to the service provider computer 104. Upon receiving the request, the service provider computer 104 may determine a category for the good or service that the user is requesting (e.g., groceries, transportation, furniture, etc.).

Assume, for the purposes of this illustrative example, that the request is for transportation services. The user may submit a destination location (and potentially an origination location) to a mobile application 110, each of which may be relayed to the service provider computer 104. The service provider computer 104 may submit a query to a transaction processing network 108 to identify each transportation service provider (i.e., the resource provider) that the user typically uses based on historical data for that user. The service provider may then send requests to servers associated with each of the identified transportation service providers to obtain pricing information for the requested transportation.

Continuing with the example above, the service provider computer 104 may, upon receiving responses from each of the identified transportation service providers, aggregate each of the responses into a single list of offers to be provided to the client device 102. Once provided, the user of the client device 102 may be given the ability to select one of the offers from the aggregated list of offers. In some embodiments, the service provider computer 104 may, upon receiving such a selection, initiate a transaction between the user and the selected transportation service provider. To do this, the service provider computer 104 may determine whether the selected transportation service provider is associated with a third-party application installed on the client device 102. If the transportation service provider is associated with a third-party application, then the service provider computer 104 may provide instructions to the client device 102 (via the mobile application 110) to instantiate an instance of the third-party application using data related to the selected response. The user may then conduct the transaction with the transportation service provider using the instance of the third-party application.

In the example above, the service provider computer 104 may also provide context-based offers to the client device 102 associated with the selected transportation service. For example, service provider computer 104 may also identify various offers associated with businesses within the vicinity of the destination location. In this example, the service provider computer 104 may provide those location-based offers to the client device 102. In some cases, the offers may be provided separate from the mobile application 110. For example, the offers may be provided in a push notification to cause the offers to appear alongside other notifications displayed by the client device 102. In this way, the mobile application 110 need not be opened to present the context-based content to the user.

Assume, for the purposes of a second illustrative example, that instead of being for transportation services, the request is for a gallon of milk, which falls under the category of groceries. The service provider computer 104 may submit a query to a transaction processing network 108 to identify each grocery store (an example resource provider) that the user typically shops at based on historical data for that user. The service provider may then send requests to servers associated with each of the identified grocery stores to obtain pricing information for a gallon of milk. In some cases, the transaction processing network 108 may identify multiple branches of the same entity. For example, the transaction processing network 108 may identify, amongst other grocery stores, that the user shops at two (or more) different branches of the same grocery store chain. In this example, the service provider computer 104 may send requests to both of those identified branches or the service provider computer 104 may just send a request to the grocery store chain itself.

Continuing with the example above, the service provider computer 104 may, upon receiving responses from each of the identified grocery stores, aggregate each of the responses into a single list of offers to be provided to the client device 102. Once provided, the user of the client device 102 may be given the ability to select one of the offers from the aggregated list of offers. In some embodiments, the service provider computer 104 may, upon receiving such a selection, initiate a transaction between the user and the selected grocery store, which may be done in a number of different ways. For example, the service provider computer 104 may determine whether the selected grocery store is associated with a third-party application installed on the client device

102. If the grocery store is associated with a third-party application, then the service provider computer 104 may provide instructions to the client device 102 (via the mobile application 110) to instantiate an instance of the third-party application using data related to the selected response. The user may then conduct the transaction with the grocery store using the instance of the third-party application. In another example, the service provider computer 104 may provide instructions to the client device 102 (via the mobile application 110) to instantiate an instance of a browser application installed on the client device 102 to cause it to connect to the grocery store's website. The instructions provided by the service provider may also cause the browser application to navigate to a store webpage for the requested item (e.g., gallon of milk). The user may then conduct the transaction with the grocery store using the instance of the third-party application. In yet another example, the service provider computer 104 may conduct the transaction on behalf of the user. In this example, the service provider computer 104 may respond to the offer provided by the grocery store with payment information associated with the user (e.g., the user's credit card number) to complete the transaction. The grocery store may then reserve the gallon of milk for the user.

In the example above, the service provider computer 104 may also provide context-based offers to the client device 102. For example, the service provider computer 104, upon receiving a selection of an offer, may identify a grocery store associated with that offer. In this example, the service provider computer 104 may then determine if there are any available discounts or specials that are also associated with that grocery store. The service provider may then provider any available discounts or specials to the client device 102. In some embodiments, the context of the context-based offers may be a destination location. For example, the service provider computer 104 may identify a location of a grocery store likely to be visited to obtain the requested item (i.e., a destination). Upon identifying that location, the service provider computer 104 may identify deals and/or discounts that are also within that location (e.g., at businesses adjacent to the destination location).

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
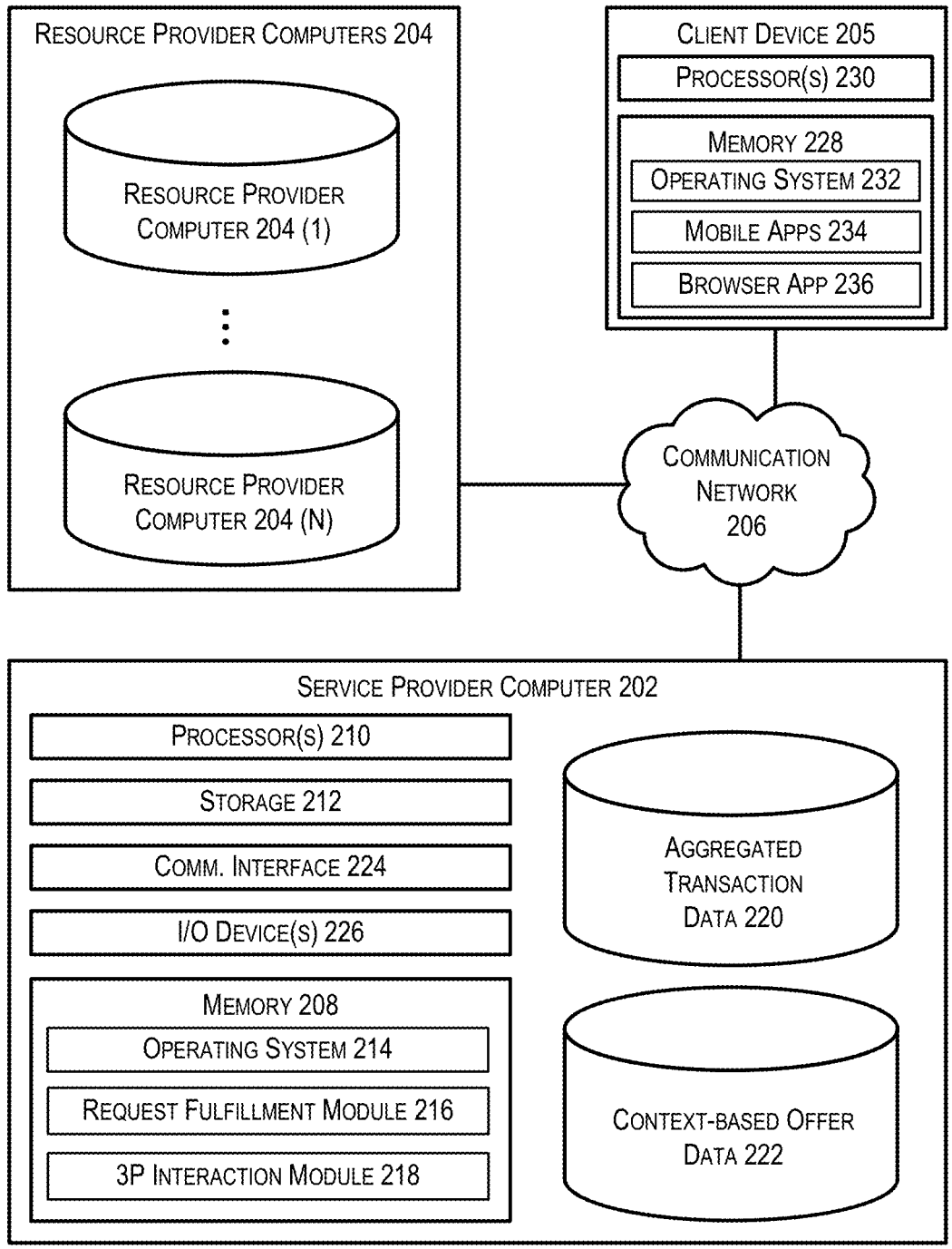
FIG. 2 depicts an example system architecture that may be implemented to generate aggregated resource bids and context-based offers in accordance with embodiments of the disclosure.

FIG. 2 depicts an example system architecture that may be implemented to generate aggregated resource bids and context-based offers in accordance with embodiments of the disclosure. In FIG. 2, a service provider computer 202 may be in communication with a number of service provider computer 202 and/or a client device 205. In some embodiments, each of the components of the depicted system architecture may communicate via a communication network connection 206. In some embodiments, the service provider computer 202 may be an example service provider computer 104 of FIG. 1.

The service provider computer 202 may be an example of service provider computer 104 as depicted in FIG. 1. In at least some embodiments, the service provider computer 202 may include at least one memory 208 and one or more processing units (or processor(s)) 210. The processor(s) 210 may be implemented as appropriate in hardware, computer-executable instructions, firmware or combinations thereof. Computer-executable instruction or firmware embodiments of the processor(s) 210 may include computer-executable or machine executable instructions written in any suitable programming language to perform the various functions described.

The memory 208 may store program instructions that are loadable and executable on the processor(s) 210, as well as data generated during the execution of these programs. Depending on the configuration and type of service provider computer 202, the memory 208 may be volatile (such as random access memory (RAM)) and/or non-volatile (such as read-only memory (ROM), flash memory, etc.). The service provider computer 202 may also include additional storage 212, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the service provider computer 202. In some embodiments, the memory 208 may include multiple different types of memory, such as static random access memory (SRAM), dynamic random access memory (DRAM) or ROM.

Turning to the contents of the memory 208 in more detail, the memory 208 may include an operating system 214 and one or more application programs or services for implementing the features disclosed herein including at least a module for communicating with resource provider computers 204 and aggregating offers (request fulfillment module 216) and/or a module for generating instructions to execute a third-party application (third-party interaction module 218). The memory 208 may also include aggregated transaction data 220, which provides historical transaction data received from a number of sources and/or context-based offer data 222, which provides offers as well as related contextual conditions to be met.

In some embodiments, the request fulfillment module 216 may, in conjunction with the processor 212, be configured to receive a request from the client device 205 with respect to a requested good or service. The request fulfillment module 216 may, in conjunction with the processor 212 upon receiving the request, be configured to identify a category of the requested good or service. Some implementations of the disclosed system may be specific to a particular category of good or service. For example, an embodiment of the disclosed system may be specific to transportation services, in which case every request received by the request fulfillment module 216 would belong to the transportation category. Once the requested good or service has been categorized, the request fulfillment module 216 may be configured to identify a number of resource provider computers 204 capable of providing the requested good or service. The request fulfillment module 216 may then generate and send requests to each of the resource provider computers 204 to request an offer with respect to the requested good or service. In some embodiments, this may involve identifying a format to be used in sending requests to each of the resource provider computers 204. Format information may be stored and maintained by the service provider computer 202 with respect to a number of resource provider computers 204.

Subsequent to sending requests to a number of resource provider computers, the request fulfillment module 216 may receive responses from each of the resource provider computers that includes an offer. The offer may contain an indication of a bid or price at which the resource provider computer 204 is willing to provide the requested good or service. Once responses are received from the resource provider computers 204, the responses may be sent to the client device 205. In some embodiments, the responses may be aggregated into a single list and sent to the client device 205 once responses are received from each of the resource provider computers 204. In some embodiments, the responses may be sent to the client device 205 as they are received and aggregated into a list on the client device 205. A user of the client device may then select an offer from the aggregated list of offers and that selection may be conveyed to the service provider computer 202. In some embodiments, the service provider computer 202 may initiate a transaction for the requested good or service based on the received selection. In some embodiments, the service provider computer 202 may generate instructions to cause the client device 205 to execute a third-party application in order to complete the transaction.

In some embodiments, the third-party interaction module 218 may, in conjunction with the processor 212, be configured to determine rules and/or processes for interacting with a particular third-party. In some embodiments, the service provider computer 202 may maintain a number of application programming interfaces (APIs) that may be used to interact with various applications and/or resource provider computers. The third-party interaction module 218 may be configured to identify an appropriate communication channel/technique for communicating with a particular resource provider computer 204. The third-party interaction module 218 may be configured to identify an appropriate technique (e.g., method or function calls) to be used in initiating a third-party application on a client device 205. In embodiments of the disclosure, the third-party interaction module may be used to generate a set of instructions that causes an instance of an application to open on the client device 205 that is at least partially pre-populated with information related to the selected offer.

The service provider computer 202 may also contain communications interface(s) 224 that enable the service provider computer 202 to communicate with a stored database, another computing device or server, one or more remote devices, other application servers, and/or any other suitable electronic devices. In some embodiments, the communication interface 224 may enable the service provider computer 202 to communicate with other electronic devices on a network (e.g., on a private network). The service provider computer 202 may also include input/output (I/O) device(s) and/or ports 226, such as for enabling connection with a keyboard, a mouse, a pen, a voice input device, a touch input device, a display, speakers, a printer, etc.

In some examples, the communication network 206 may include any one or a combination of many different types of networks, such as cable networks, the Internet, wireless networks, cellular networks, and other private and/or public networks. In addition, the communication network 206 may comprise multiple different networks. For example, a client device 205 may utilize a 3G network to communicate with a wireless router, which may then route the communication over a public network (e.g., the Internet) to the service provider computer 202.

In some embodiments, the resource provider computers 204 (1-N) may include a number of server devices, each of which may be affiliated with different providers of resources. In some embodiments, at least some of the resource provider computers 204 may maintain an electronic catalog that includes a set of goods and/or services offered by that resource provider. In some embodiments, each of the resource provider computers 204 may be associated with a category of goods and/or services that are provided by that resource provider computer 204. Each resource provider may be associated with multiple categories. In some embodiments, the service provider computer 202 may maintain a list of available resource provider computers 204 and their categorizations.

In some embodiments, the client device 205 may comprise any portable electronic device capable of communicating with the service provider computer 202 and/or the resource provider computers 204. The client device 205 may include a memory 228 (e.g., a computer-readable storage medium) storing instructions that, when executed by a processor 230 of the client device 205, allow the client device to perform its intended functions. Turning to the contents of the memory 228 in more detail, the memory 228 may include an operating system 232 that provides executable program instructions for the general administration and operation of the client device 205, and one or more mobile applications 234, at least one of which may be configured to cause the client device 205 to communicate with the service provider computer 202 in order to relay a request from a user of the client device 205 to the service provider and subsequently receive an aggregated list of offers related to the request.

In some embodiments, the mobile applications 234 may, in conjunction with the processor 212, be configured to enable access to the service provider computer 202 and/or a resource provider computer 204. In some embodiments, a number of the mobile applications 234 may be special-purpose applications configured to perform functions specific to the service provider computer or a particular resource provider. In some embodiments, at least one of the mobile applications 234 may be a browser application 236 which is configured to receive and display website information. The browser application 236 may be used to access a resource provider computer 204 by presenting information obtained from a website maintained by that resource provider on the client device 205.

Figure 3:
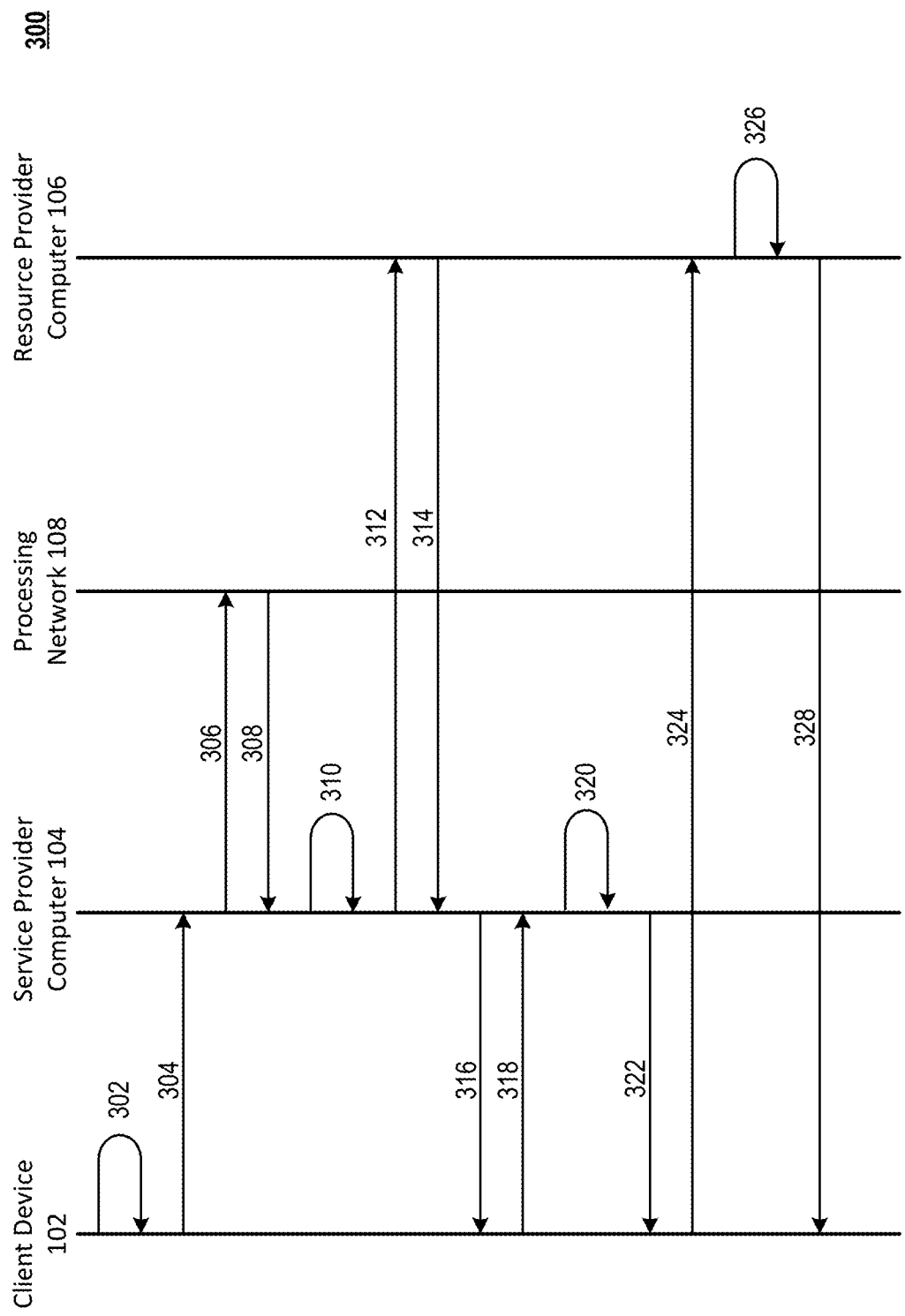
FIG. 3 depicts a swim lane diagram depicting a process for aggregating offers from a plurality of resource provider computers and conducting a transaction based on those aggregated offers in accordance with at least some embodiments.

FIG. 3 depicts a swim lane diagram depicting a process for aggregating offers from a plurality of resource providers and conducting a transaction based on those aggregated offers in accordance with at least some embodiments. The process 300 illustrates potential interactions between various components described with respect to FIG. 1 above. For example, depicted in process 300 is a client device 102 (which may be an example of the client device 102 depicted in FIG. 1), a service provider computer 104 (which may be an example of the service provider computer 104 depicted in FIG. 1), a processing network 108 (which may be an example of the processing network 108 depicted in FIG. 1), and a resource provider computer 106 (which may be an example of a resource provider computer 106 depicted in FIG. 1).

In accordance with at least some embodiments, a user of the client device 102 may initiate the process 300 at 302 by generating a request for a good or service. The request may be generated upon receiving a user's input via a graphical user interface (GUI). An instance of a GUI may be instantiated by a mobile application supported by the service provider computer 104 or within a browser application. In some embodiments, the request may be generated upon a user providing an indication of a product or other resource (e.g., entering an indication of the product into a text input field) for which the user would like to conduct a transaction. Some embodiments of the system described herein may be directed to a particular product or type of product. In these embodiments, the user may be asked to provide details related to a transaction for that particular product. For example, in embodiments of the described system which are directed toward transportation, the user may be asked to enter at least a destination location. In this example, at least some information (e.g., the user's current location) may be provided by the client device 102 or by an account maintained in relation to the user at the service provider computer 104.

At 304, the generated request may be transmitted from the client device 102 to the service provider computer 104. In some cases, the service provider computer 104 may identify a category for, or otherwise classify, the product related to the request. For example, if the user has submitted a request related to "peanut butter," then the service provider computer 104 may categorize the request as being related to "groceries." Some embodiments of the disclosure may be focused on a particular product, in which there may be no need for the service provider computer 104 to categorize the product. In some embodiments, the service provider computer 104 may maintain a list of resource providers capable of providing a particular resource or category of resource.

In some embodiments, the service provider computer 104 may contact a processing network 108 at 306 to identify a number of resource providers capable of servicing the received request. In some embodiments, the service provider computer 104 may provide the category assigned to the requested product and the processing network 108 may identify resource providers with which the user has transacted in the past and which are capable of providing the requested product (e.g., resource providers that deal in the provided category). The list of resource providers may be provided by the processing network 108 to the service provider computer 104 at 308 in a response to the contact initiated at 306.

At 310, the service provider computer 104 may identify a set of resource provider computers to contact with respect to the request. In some embodiments, the set of resource provider computers may be limited to those associated with mobile applications installed on the client device 102. In some embodiments, the set of resource provider computers may be limited to, or ordered based on, the list of resource provider computers provided by the processing network 108. For example, the processing network 108 may return not only a list of resource providers used by the user, but also an indication of a preference amongst the resource providers on the list (e.g., a number of times that each of those resource providers has been used). In some embodiments, the service provider computer 104 may maintain a mapping between each resource provider and its corresponding resource provider computer 106.

Once a set of resource provider computers has been identified, requests may be generated to solicit offer content from each of the resource provider computers in the set of resource provider computers at 312. In some embodiments, this may involve the use of an API or other set of routines specific to the resource provider computer 106. For example, the service provider computer 104 may maintain a number of APIs which contain routines for interacting with various resource provider computers 106. In some embodiments, an API may execute methods that are typically called by a mobile application associated with the resource provider installed on the client device 102. In some embodiments, a service provider computer 104 may maintain a list of method calls that may be made to a service implemented on a resource provider computer 106. In some embodiments, the service provider computer 104 may submit a request to a particular resource provider computer 106 by interacting with a website maintained by that resource provider computer 106.

At 314, the service provider computer 104 may receive responses from each of the resource provider computers 106 in the set of resource provider computers. The resource provider computers 106 may provide a response in the form of an offer content that includes at least a price or cost at which the product is available through the resource provider. In some embodiments, the offer content may also include any other information relevant to a potential transaction (e.g., a description of the item, etc.). In the event that the product is unavailable, the resource provider computer 106 may provide a response that indicates the product's unavailability. In some cases, the resource provider computer 106 may not provide any response if the product is unavailable. In some embodiments, the service provider 104 may remove the resource provider computer 106 from the list of identified resource provider computers if no response is received from that resource provider computer within a predetermined period of time. In that scenario, the service provider 104 may act as if the product is unavailable from the resource provider computer 106.

At 316, the service provider computer 104 may provide at least some of the received responses to the client device 102. In some embodiments, a response received from a resource provider computer 106 that indicates the requested good or service is unavailable may not be provided to the client device 102. In some embodiments, the service provider computer 104 may limit the responses provided based on some other criteria. For example, the service provider computer 104 may provide only the five offers having the lowest price to the client device 102. In some embodiments, offer content provided to the client device 102 may be ordered in accordance with various criteria. For example, the aggregated offer content may be ordered according to the best price, shortest time to fulfillment, most preferred resource provider (e.g., according to historical transaction data for the user), or any other suitable criteria.

At 318, the user may select an offer content from the list of offer content provided to the client device 102. An indication of the selection may be transmitted to the service provider computer 104. Upon receiving that selection, the service provider may determine an appropriate means for initiating a transaction based on the selected offer at 320. For example, the service provider computer 104, upon receiving an indication that a particular offer associated with a particular resource provider has been selected, may identify an API to be used to execute a mobile application installed on the client device 102 associated with the particular resource provider. In this example, the service provider computer 104 may identify one or more routines related to execution of the mobile application associated with the resource provider.

The service provider computer 104, upon determining the appropriate means for initiating the transaction based on the selected offer, may generate instructions to cause the client device 102 to initiate the transaction. The generated instructions may be provided to the client device 102 at 322. When executed, the set of instructions may cause the client device 102 to open an instance of the mobile application associated with the selected resource provider. The opened instance of the mobile application may be at least partially populated with information related to the requested product.

In some embodiments, the service provider computer 104 may initiate a transaction on behalf of the user based on the selected offer content. For example, the service provider computer 104 may maintain payment account information for the user (e.g., a credit card number or payment token) as well as shipping information. The service provider computer 104 may conduct a transaction of the selected offer content using that information.

At 324, the transaction may be initiated between the client device 102 and the selected resource provider computer 106. The user may be given the ability, via the instanced mobile application, to communicate a number of transaction details directly to the resource provider computer 106. In some embodiments, the user may be asked to provide payment information and/or shipping information to the resource provider to complete the transaction. In some embodiments, the user may be asked to log into an account maintained by the resource provider computer 106. In some embodiments, the payment information can be stored by the resource provider computer 106 or an external wallet application server in communication with the resource provider computer 106.

The resource provider computer 106 may perform an authorization step at 326 to obtain approval to conduct the transaction. For example, the resource provider computer 106 may request authorization from an authorization entity computer operated by an authorization entity such as an issuer for approval. In a typical authorization process, a resource provider computer 106 (or an access device) operated by the resource provider can generate an authorization request message. The authorization request message may be transmitted to the authorization computer via a transport computer (e.g., an acquirer computer) operated by an acquirer and a processing network operated by a payment processor. The authorization entity computer may then authorize or decline the transaction. After making its decision, the authorization entity computer can generate an authorization response message. The authorization response message may be transmitted back to the resource provider computer via the processing network and the transport computer. Once the transaction has been approved, the resource provider computer 106 may provide an indication of the transaction's approval to the client device 102 at 328. Additionally, at a later point in time, the authorizing entity computer, the transport computer, and the processing network may perform a clearing and settlement process to settle the transaction.

Figure 4:
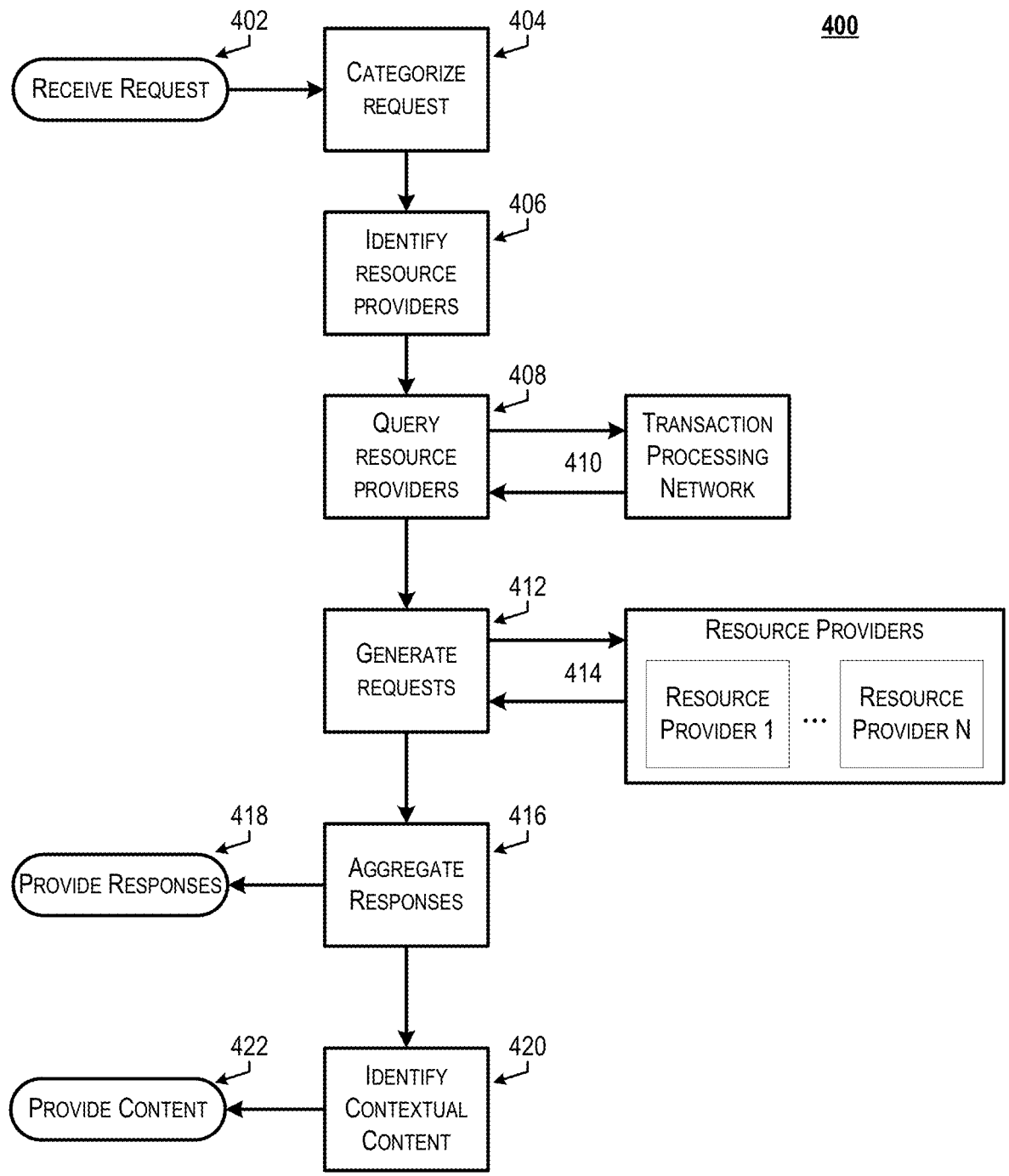
FIG. 4 depicts a process for providing backend support to a mobile application installed on a client device in accordance with embodiments of the disclosure.

FIG. 4 depicts a process for providing backend support to a mobile application installed on a client device in accordance with embodiments of the disclosure. Some or all of the process 400 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 400 depicted in FIG. 4 may be performed by the service provider computer 202 as described with respect to FIG. 2 above. The code may be stored on a computer-readable storage medium, for example, in the form of a computer program including a plurality of instructions executable by one or more processors. The computer-readable storage medium may be non-transitory.

In some embodiments, the process 400 may begin at 402, when a request is received with respect to a particular product (e.g., good or service). In some embodiments, the request may be submitted via a mobile application associated with the service provider computer. In some embodiments, the request may be submitted using a browser application (e.g., via a website maintained by the service provider computer). In some embodiments, the request may include a number of details in relation to a transaction to be conducted for the requested product.

At 404, in some embodiments, the service provider computer may categorize the request upon its receipt. This may involve categorizing either a product identified within the request or an action to be taken with respect to that product. The service provider computer may identify a number of resource providers capable of providing the requested product at 406. For example, for each potential product category, the service provider computer may maintain a list of resource providers that are likely to offer the requested product. In some embodiments, a mobile application installed on the client device may communicate information to the service provider computer indicating a number of resource providers available with respect to the client device. For example, the client device may have installed on it a number of mobile applications, each of which is configured to enable functionality provided by a resource provider. In this example, the client device may be caused (e.g., via a mobile application associated with the service provider computer) to transmit a list of relevant mobile applications to the service provider computer. The service provider computer may then determine which of the resource providers on that list is capable of fulfilling the request.

At 408, the service provider computer may query a transaction processing network to determine which of the identified resource providers are preferred by the user. In some embodiments, this may involve the service provider computer transmitting a list of resource providers to the transaction processing network. The transaction processing network may then identify a number of transactions associated with each of the resource providers that have been conducted by the user.

At 410, the transaction processing network, in response to the received query, may analyze the user's historical transaction data to generate a list of preferred resource providers. In some embodiments, the transaction processing network may provide some indication of a ranking of the resource providers (e.g., an ordered list) based on the user's tendency to conduct transactions with that resource provider. In some embodiments, the ranking may be determined based at least in part with respect to time. For example, the transaction processing network may determine that the user has conducted 12 transactions with Resource Provider A within the last 3 months, 31 transactions with Resource Provider B within the last 3 months, and 25 transactions with Resource Provider C within the last 3 months. In this example, the transaction processing network may determine that Resource Provider B is currently the user's most preferred resource provider. The transaction processing network may provide an ordered list of resource providers to the service provider computer that includes <Resource Provider B, Resource Provider C, Resource Provider A>.

At 412, the service provider computer may generate requests to each of the resource providers to provide indications of a potential transaction that may be conducted for the requested product. In some embodiments, the service provider computer may maintain a library of APIs that include routines and/or protocols for interacting with various resource providers. The library of APIs may include APIs for interacting with both a resource provider computer as well as a mobile application associated with a resource provider. To generate a request to a particular resource provider, the service provider computer may access the library of APIs to identify an API associated with the particular resource provider. The service provider computer may then formulate a request in accordance with methods and/or routines associated with the API.

At 414, a number of resource providers may generate responses to the requests. Some resource providers may indicate that the product is unavailable or is unable to be identified. In some embodiments, the resource provider may generate a response only if it is able to provide the requested product. The responses may be provided by the resource provider to the service provider computer via a return or out parameter of a method call used in accordance with the identified API.

At 416, the service provider computer may aggregate the received responses and provide them to the client device. At least some of the received responses may be provided to the client device from which the request was received at 418. In some embodiments, the service provider computer may aggregate each response received from the resource providers (e.g., those received within a predetermined amount of time) into a single list that may be provided to the client device. In some embodiments, the service provider computer may transmit each response as it is received from a resource provider. The user may then be given the ability to select a response from the aggregated list of responses.

At 420, the service provider computer may identify context-based content related to the received request. In some embodiments, the context may include a location and/or time associated with the request. For example, the context may include a location at which the user is predicted to be, as well as a time at which the user is predicted to be at that location. Upon identifying this context, the service provider computer may determine one or more additional content to provide the user based on that context. For example, if the user selects a particular resource provider to provide the requested product, the service provider computer may identify a number of additional offers available from that resource provider. Since the user is predicted to conduct a transaction with that resource provider already, the service provider computer may elect to present those additional offers to the user for his or her consideration. The additional offers may then be compiled into a context-based content, and may be provided to the user at 422. In some embodiments, the context may be a destination location. For example, if the user requests transportation to a particular location, then the service provider computer may identify a number of offers associated with locations proximate to the identified destination location to be provided to the user.

Figure 5:
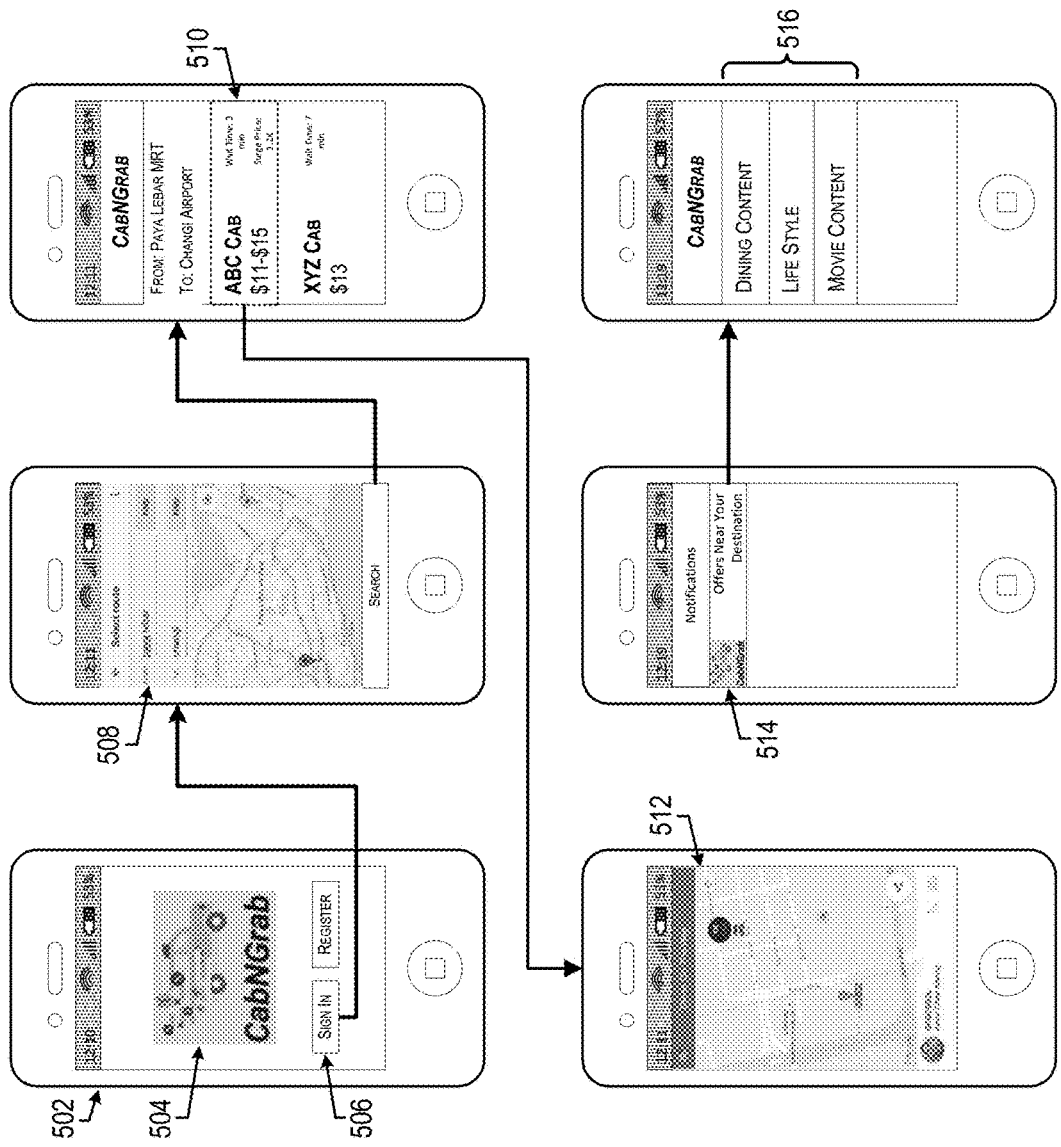
FIG. 5 depicts an illustrative example of an embodiment of the disclosure directed toward transportation resources.

FIG. 5 depicts an illustrative example of an embodiment of the disclosure directed toward transportation resources. Depicted in FIG. 5 is a user device 502 and an illustrative example of a mobile application 504 installed on and executed from the mobile device 502. The mobile application 504 may be configured to perform at least some of the functionality described herein with respect to transportation services. In some embodiments, a graphical user interface (GUI) 504 may be instantiated by the mobile application.

In FIG. 5, a user may open the mobile application 504 on the mobile device 502. In some embodiments, the user may be required to log into an account maintained by a service provider computer associated with the mobile application 504 via a login option 506. In some embodiments, the mobile application 504 may implement one or more services provided by a third party service provider computer. For example, a mobile application 504 that focuses on transportation services may be built using a mapping service API.

In the depicted example of the mobile application 504 which provides transportation services, a user may enter a destination via a text input field 508. In some embodiments, the user of the transportation service mobile application may also provide an origination location. In some embodiments, an origination location may be determined automatically using a global positioning system (GPS) device of the mobile device 502. The input from the text input field 508 may be relayed to the service provider computer, which may use the text input to obtain a number of offers from various transportation providers. In some embodiments, the mobile application 504 may provide a list of relevant mobile applications installed on the mobile device 502.

The service provider computer may provide information entered by the user to a number of transportation provider servers using APIs associated with those transportation providers. In this illustrative example, each transportation provider may separately determine availability of drivers and calculate a route from the origination location to the indicated destination location in order to estimate a cost of providing transportation to the provided destination location. The transportation providers may then each provide responses to the service provider computer that include pricing/time estimation data.

Upon receiving the responses from each transportation provider, the service provider computer may relay those responses to the mobile device 502, which may display each of the offers 510 within the GUI. The offers 510 may each include any relevant information, such as an estimated price, an estimated wait time, or any other information that the user may be interested in. The GUI may be configured to enable a user to select one of the displayed offers 510 via the GUI.

Upon selection of one of the displayed offers 510, the mobile device 502 may be caused to open a transportation application 512 associated with the selected offer. In some cases, this may involve the use of an API configured to interact with the transportation application. In some embodiments, the service provider computer may identify routines to be used in communicating with the transportation application from an API library. The transportation application 512 may be provided by the mobile application 504 with information related to the originally-submitted request for transportation services (e.g., the destination location). The user may then complete a transaction for the requested transportation service using the transportation application 512. In some embodiments, the user may maintain a separate account with the transportation application that may be used to complete the transaction. The payment process used to complete the transaction may be similar to that described above with respect to step 326 in FIG. 3.

In some embodiments, the service provider computer may also identify context-based content to provide to the user of the mobile device 502. For example, the service provider computer may identify a number of additional offers that may be redeemed at locations proximate to the received destination location. In some embodiments, the context-based offers may be compiled into a notification 514, that may be transmitted to the mobile device 502. For example, a number of context-based content may be provided to the mobile device 502 via a push notification. Upon selection of the notification, the user may be presented with a listing of offers 516 included in the context-based content.

Figure 6:
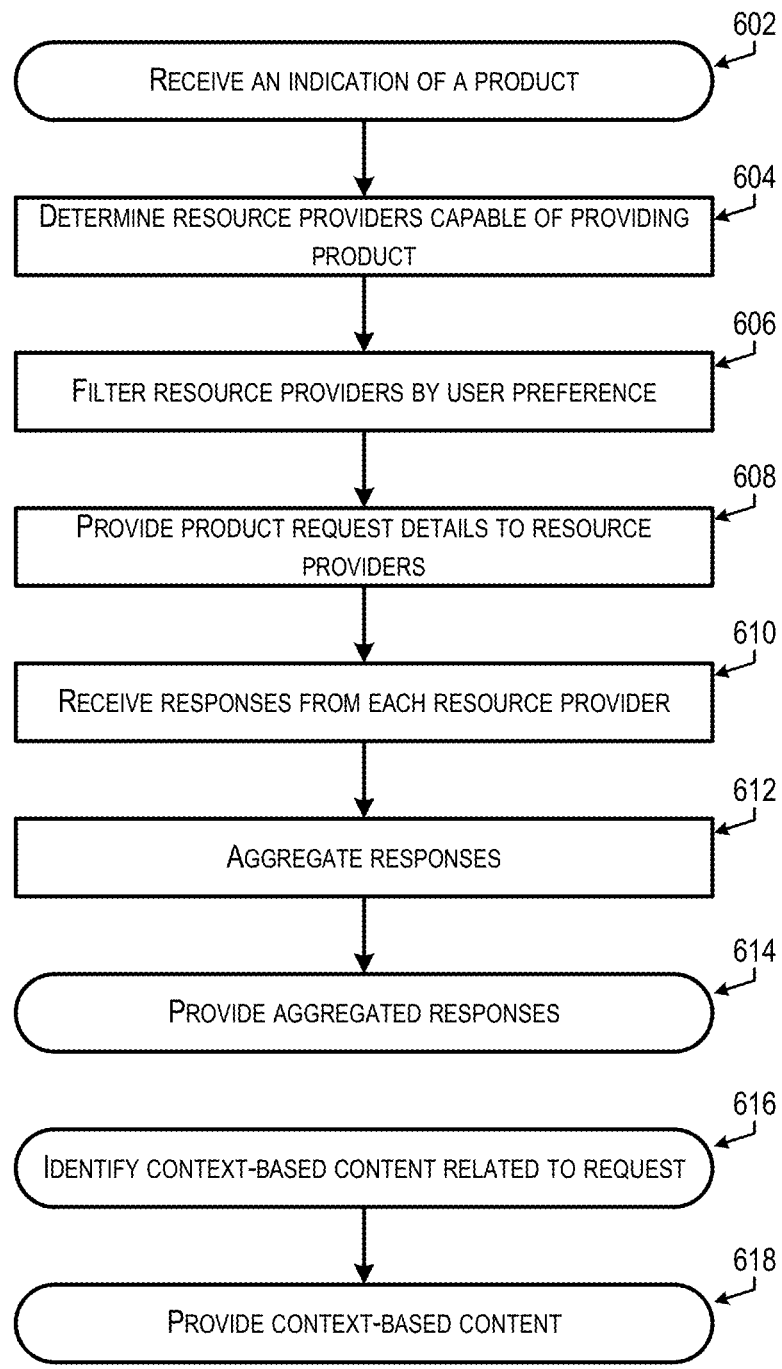
FIG. 6 depicts a flow diagram illustrating a process for providing an aggregated list of responses and context-based content in accordance with at least some embodiments.

FIG. 6 depicts a flow diagram illustrating a process for providing an aggregated list of responses and context-based content in accordance with at least some embodiments. The process 600 may be performed by a service provider computer 202 as depicted in FIG. 2.

Process 600 may begin at 602, when an indication of a requested product/resource is received from a client device.

In some embodiments, the request may be received via a website maintained by the service provider computer. For example, the user may access the website via a browser application installed on a client device and submit a request for a resource. In some embodiments, the request may be received from a mobile application installed on the client device in communication with the service provider computer.

At 604, the service provider computer may determine a number of resource providers capable of providing the requested product. In some embodiments, the service provider computer may maintain a list of service resource providers and their respective resource offerings. In some embodiments, the service provider may categorize the resource provider and determine which resource providers provide access to the determined category. The service provider computer may communicate with a transaction processing network to identify the resource providers. For example, the transaction processing network may identify a number of resource providers that the user has previously transacted with that deal in the requested resource.

At 606, the resource providers may be filtered according to user preferences. In some embodiments, user preferences may be determined automatically based on the user's historical transaction data. In some embodiments, user preferences may be stored in relation to an account associated with the user that is maintained by the service provider computer. For example, the user, during an account enrollment process or afterward, may indicate a number of preferences. Amongst other configuration settings, the preferences may indicate which resource providers the user prefers.

At 608, information relevant to the requested product is provided to the resource providers. To do this, the service provider computer may access a library of APIs associated with a number of resource providers. The service provider computer may identify, from the APIs, routines (e.g., method calls) for communicating with servers associated with the resource providers. The service provider computer may then format a request in accordance with the identified routines. This may be repeated for each of the resource providers to which a request is to be sent.

At 610, the service provider computer may receive responses from each of the resource providers. In some embodiments, the responses may be received via the routines identified for the resource provider. For example, if a request submitted by the service provider computer to a resource provider includes a method call used by the resource provider, then the service provider computer may receive a response via a return (or output) parameter used in the method call. In some embodiments, the response received from the resource provider may be received separate from the generated request. For example, the resource provider may generate content in response to receiving the request and may subsequently send the generated content to the service provider computer.

The received responses may be aggregated at 612 and the service provider computer may provide the responses to the client device at 614. In some embodiments, the responses may be aggregated by the service provider computer as they are received from the resource providers. In some embodiments, the service provider computer may only aggregate responses received within a predetermined threshold amount of time. For example, the service provider computer may aggregate only responses received within 30 seconds of being sent to resource providers. In some embodiments, the service provider computer may relay each response to the client device as it is received and a mobile application installed on the client device may aggregate the received responses. The aggregated responses may then be presented to a user via a display of the client device, from which the user may select a response.

Upon selection of a response by the user, a transaction associated with the response may be initiated. In some cases, this may involve the service provider computer conducting the transaction with the resource provider on behalf of the user. In some cases, this may involve causing a mobile application associated with that resource provider to execute in order to complete the transaction. For example, the service provider computer, upon receiving a selection of a response from the aggregated list of responses, may identify an API for a mobile application which is associated with the resource provider of the selected response. In this example, the API may include routines for interacting with the mobile application associated with the resource provider of the selected response. The service provider computer may generate computer-executable instructions to cause the resource provider mobile application to be executed using the identified API. A transaction may then be completed using the resource provider mobile application.

At 616, the service provider computer may also identify context-based content related to the request and/or a selected response. In some embodiments, a context for a request or selected response may include any factors surrounding the transaction to be conducted. For example, a context may include a location at which the transaction is to be conducted, a time at which the transaction is to be conducted, a type of resource provider with which the transactions is to be conducted, an amount for which the transaction is to be conducted, or any other suitable factor. The service provider computer may determine that content maintained by the service provider computer (or by a third-party entity unaffiliated with the service provider) is relevant to the identified context. For example, the service provider computer may identify additional content related to a location that is proximate to the location at which the transaction is to be conducted.

At 618, the additional context-based content may be provided to the client device. In some embodiments, the additional context-based content may be provided via an advertisement or other offer displayed on a display of the client device (e.g., after selection of the response by the user but before the transaction is initiated). In some embodiments, the additional context-based content may be provided to the client device via a push notification over a communication channel maintained between the service provider computer and the mobile application on the mobile device.

Embodiments of the invention provide for a number of technical advantages over conventional systems. For example, embodiments of the invention enable a user to check a number of resource providers for availability and pricing of a desired resource in a single action. In this example, the user is able to quickly identify which resource provider offers the best deal on the requested product and complete a transaction through that resource provider. Additionally, in some embodiments a user is provided information from only those resource providers that he or she prefers (e.g., those that the user tends to use). Furthermore, embodiments of the system enable presentation of offers that are relevant to the users interests as well as the user's predicted future actions (e.g., the user's predicted location). This allows the service provider to better target the user with additional content.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of presenting a plurality of content to a client device comprising:

receiving, from the client device, a request including an indication of a transportation service and first information identifying third-party applications installed on the client device;

determining a plurality of resource provider computers capable of providing the transportation service based on historical transaction data associated with a user of the client device and a category associated with the transportation service, the category determined based on the first information;

providing, to each of the resource provider computers in the plurality of resource provider computers, second information associated with the transportation service obtained from the request, the second information including at least a pickup location and a drop-off location;

receiving, from each of the resource provider computers in the plurality of resource provider computers, content generated for the transportation service based on the second information associated with the transportation service, the content comprising at least an estimated cost of traveling from the pickup location to the drop-off location;

providing, to the client device, an aggregated list of content associated with the transportation service received from the plurality of resource provider computers;

identifying, based on at least the drop-off location and a time period associated with the request, a set of additional context-based content, the set of additional context-based content comprising advertisements for merchants near the drop-off location; and providing, to the client device, the set of additional context-based content, the set of additional context-based content being presented on a display of the client device, wherein upon receiving an indication of a transaction to be initiated via a selection of the content from the aggregated list of content associated with the transportation service received from the plurality of resource provider computer and after presentation of the set of additional context-based content, the client device is caused to execute a mobile application associated with a resource provider which provided the selection of content, the mobile application executed via an application programming interface (API) associated with the mobile application and pre-populated with a portion of the set of additional context-based content.

2. The method of claim 1, wherein the plurality of resource provider computers comprise a number of transportation provider computers.

3. The method of claim 2, wherein the second information associated with the transportation service is provided to each of the transportation providers via a transportation application associated with that transportation provider computer.

4. The method of claim 1, further comprising upon receiving, from the client device, the selection of the content from the aggregated list of content, initiating the transaction for the transportation service from the resource provider computer of the plurality of resource provider computers.

5. A service provider computer comprising:

one or more processors; and a memory including instructions that, when executed by the one or more processors, cause the service provider computer to:

receive, from a client device, a request that includes an indication of a transportation service and first information identifying third-party applications installed on the client device;

determine a plurality of resource provider computers capable of providing the transportation service based on historical transaction data associated with a user of the client device and a category associated with the transportation service, the category determined based on the first information;

provide, to each of the resource provider computers in the plurality of resource provider computers, second information associated with the transportation service obtained from the request, the second information including at least a pickup location and a drop-off location;

receive, from each of the resource provider computers in the plurality of resource provider computers, content generated for the transportation service based on the second information associated with the transportation service, the content comprising at least an estimated cost of traveling from the pickup location to the drop-off location;

provide, to the client device, an aggregated list of content associated with the transportation service received from the plurality of resource provider computers;

identify, based on at least the drop-off location and a time period associated with the request, a set of additional context-based content, the set of additional context-based content comprising advertisements for merchants near the drop-off location; and provide, to the client device, the set of additional context-based content, the set of additional context-based content being presented on a display of the client device, wherein upon receiving an indication of a transaction to be initiated via a selection of the content from the aggregated list of content associated with the transportation service received from the plurality of resource provider computer and after presentation of the set of additional context-based content, the client device is caused to execute a mobile application associated with a resource provider which provided the selection of content, the mobile application executed via an application programming interface (API) associated with the mobile application and pre-populated with a portion of the set of additional context-based content.

6. The service provider computer of claim 5, wherein the instructions further cause the service provider computer to:
receive the content selection from the aggregated list of content; and
initiate the transaction between the client device and the resource provider computer associated with the content selection.

7. The service provider computer of claim 6, wherein initiating the transaction between the client device and the resource provider computer associated with the content selection comprises conducting the transaction on behalf of the user with the resource provider computer associated with the content selection.

8. The service provider computer of claim 6, wherein initiating the transaction between the user and the resource provider computer associated with the content selection comprises causing the client device to initiate an application associated with the resource provider computer associated with the content selection.

9. The service provider computer of claim 5, wherein the plurality of resource provider computers capable of providing the transportation service are ordered based on the historical transaction data.

10. A client device comprising:
one or more processors; and
a memory including instructions that, when executed by the one or more processors, cause the client device to:
receive an indication of a transportation service requested by a user of the client device, the indication associated with first information that identifies third-party applications installed on the client device;
provide the indication, the first information, and second information associated with the transportation service to a service provider computer, the second information including at least a pickup location and a drop-off location;
receive, from the service provider computer, a plurality of content related to the requested transportation service based at least in part on the first information and the second information, each of the plurality of content associated with a different resource provider computer and comprising at least an estimated cost of traveling from the pickup location to the drop-off location;
receive, from the service provider computer, a set of context-based content, the set of context-based content generated based on at least the drop-off location and a time period associated with the indication, the set of context-based content comprising advertisements for merchants near the drop-off location;
display the set of context-based content on a display of the client device before receiving a selection of a content of the plurality of content;
receive, from the user of the client device, the selection of the content of the plurality of content; and
initiate a mobile application associated with a resource provider computer of the selected content via an application programming interface (API) associated with the mobile application, wherein initiating the mobile application includes pre-populating the mobile application with a portion of the set of context-based content.

11. The client device of claim 10, wherein the mobile application is provided the second information from the indication of the resource requested by the user of the client device upon its initiation.

12. The client device of claim 10, wherein the client device further comprises a global positioning system and the instructions further cause the client device to provide GPS coordinates to the service provider computer, the service provider computer providing the GPS coordinates to each of the different resource provider computers to generate the plurality of content.

13. The client device of claim 10, wherein the set of context-based content is received via a push notification.

* * * * *